A. HAMMER.
Mash Apparatus.
No. 12,160. Patented Jan. 2, 1855.
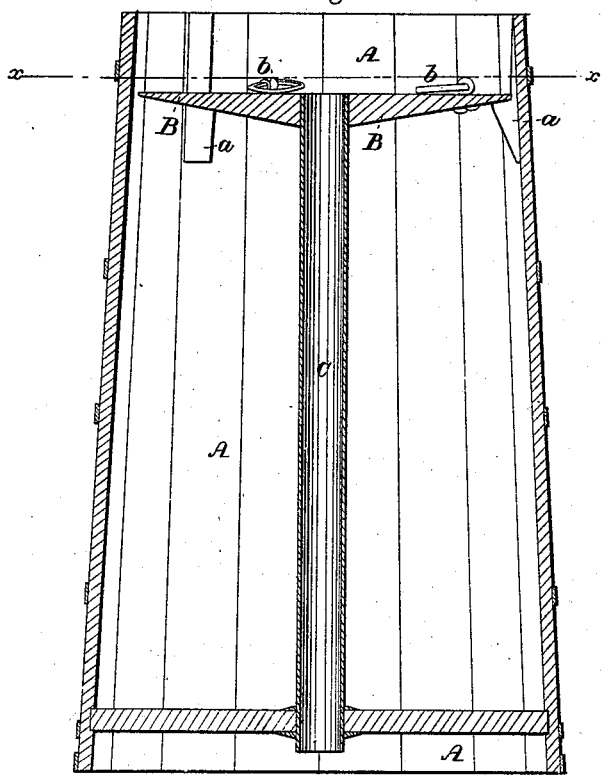
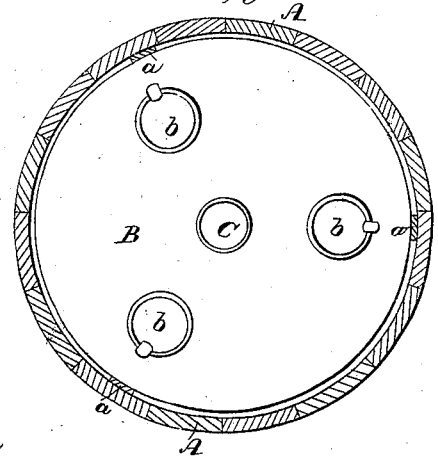

UNITED STATES PATENT OFFICE.

ADOLPH HAMMER, OF PHILADELPHIA, PENNSYLVANIA.

FERMENTING-TUN FOR BEER.

Specification of Letters Patent No. 12,160, dated January 2, 1855.

*To all whom it may concern:*

Be it known that I, ADOLPH HAMMER, of the city of Philadelphia and State of Pennsylvania, have invented a new and useful Apparatus for Fermenting Malt Liquors; and I do hereby declare that the following is a full, clear, and exact description of the construction and operation of the same; reference being had to the annexed drawings, making a part of this specification, in which—

Figure 1, is a longitudinal vertical section through the middle; and Fig. 2, a transverse section through the dotted lines $x$ $x$, of Fig. 1; like letters indicating like parts in both figures.

The nature of my invention consists in providing a suitable "tun" or large fermenting vessel, and adapting thereto an adjustable cover of peculiar construction, and a stationary conduit pipe, so that the wort to be fermented may be preserved from the injurious chemical action of the atmosphere, during the process, in a more perfect manner than heretofore; and a great economy of cellar room, time, expense and labor effected.

A, is a large vessel, called a "tun", which is made in the usual manner and form, of cedar wood and firmly hooped with iron. About two feet or so, from the upper end of this tun, three cleats or projections ($a$, $a$, $a$,) are secured on the inner side, so as to support a cover (B). This cover is made about four inches less in diameter than the interior of the tun at this part—so that when resting upon the three cleats ($a$) there may be left a continuous open space of about two inches width between the edge of the cover (B) and the inner side of the tun (A). The cover is made plane on the upper and beveled on the under side from its center to the edge thereof. Its center is also perforated, so as to admit through it accurately, the upper end of a conduit pipe (C), which is firmly fixed ("water tight") in the center of the bottom of the tun so as to project about two inches below the same. Attached on the upper side of the cover are also three hand rings ($b$, $b$, $b$,) or their equivalents, for convenience in lifting off, or replacing the same.

In order, the better to point out the superior advantages peculiar to my invention, I will proceed to describe the apparatuses and process, now generally adopted by brewers for the fermentation of malt liquor or wort. For a brewery of any considerable size, for instance, one brewing one hundred barrels per day, a large cellar has to be provided, capable of holding about one hundred and fifty puncheons (each puncheon capable of holding about four barrels)— each days brewing requiring about six days to complete the fermentation—hence the large number of puncheons required. These puncheons are arranged on their sides, in rows, upon long troughs called "stillings," and filled with the wort or liquor to be fermented. During the process of fermentation, it is important to keep the contents of each puncheon at about the same certain temperature—which is found to be difficult and generally impracticable. The frothy matter which works out at the bung holes, runs down the sides of the puncheons and drops into the stilling troughs, and being mainly composed of yeast and wort partially fermented, a more perfect separation between them takes place in the troughs, the carbonic acid gas escaping therefrom freely, and the liquor accumulating therein, requires to be returned, from time to time, to the puncheons as the process continues— and this liquor, having thus been exposed to the free action of the atmosphere, necessarily becomes deteriorated, and sometimes sour, and consequently, being returned to the puncheons, injuriously affects the whole brewing. After the fermentation has ceased, the liquor has to be racked out of each puncheon, and conveyed to the vat for storing, or filling into barrels for "sending out."

It will be perceived that in the mode of fermenting malt liquor as above described, the expense of providing cellar room, and the numerous puncheons and stillings, is very great, besides the difficulty, and labor required to keep the puncheons sweet and in cleanly order; and to attend to the filling, and frequent refilling of the same during the process of fermentation—and also that a large percentage of waste must occur unless the deteriorated liquor in the stilling troughs is returned to the puncheons.

To obviate all these objections is an important object effected by my invention, but the chief object attained thereby, consists in the fact that I am enabled to produce a more sound and far better keeping malt liquor.

I usually construct the tun (A) about eight feet in height and ten feet medium diameter, or of sufficient capacity below the cover (B) to hold the whole of one day's brewing, and as it takes only about four days with my apparatus (in consequence of the process of fermentation being more rapid, the quantity of liquor in one vessel being so much greater) to complete the fermentation, about four of these tuns are all that are required, even when I brew every day, and consequently the amount of cellar room required is comparatively trifling. The wort with the proper quantity of yeast, and the degree of temperature is run into a tun daily, until the liquor reaches the upper side of the cover, (it having been previously placed so as to rest upon the cleats $(a,a,a)$,), thus closing up the "continuous space" between its edge and the inner side of the tun. The upper end of the conduit pipe (C) being now flush with the upper side of the cover, and having been previously stopped with a suitable plug, the fermentation of the wort in due time proceeds. During the process, the yeasty froth works up, and with the generated carbonic acid gas, fills the space above the surface of the cover—thus expending all the atmospheric air—and the carbonic acid gas and yeast, constantly forcing their way between the edges of the cover and the sides of the tun, and accumulating over the cover and within the space above the same, which space being amply sufficient to contain all the yeast and a large portion of the carbonic acid gas—there is thus necessarily formed a perfect medium of protection to the wort, from the chemical action of the atmosphere; the carbonic acid gas being of greater specific weight, necessarily has a tendency to fall rather than to rise—and hence the space above the cover will be entirely filled before any of the gas can leave the tun. After the fermentation has ceased, the plug in the upper end of the conduit pipe (C) is withdrawn, and the yeast and remaining carbonic acid gas above the cover, passes down through the pipe into any suitable vessel or waste trough, previously placed beneath the tun, and the liquor being now fined, is conveniently run into the vat for storage, or into barrels for "sending out."

It will now be perceived that my invention effects the following important advantages over the old arrangements requiring the use of the numerous inventions and stillings before described—viz: 1st, a great economy in cellar room; 2nd, a like economy of capital, in the substitution of a few large tuns, for the numerous and more expensive puncheons and stillings heretofore required; 3rd, greater convenience, facility and perfection in cleaning the inside of the tuns, and keeping them sweet and in perfect order; 4th, greater economy of labor and time, in filling and avoiding the refilling required in the old arrangements during the process of fermentation and in racking and running off to the vat or barrels; 5th, a perfect equality in the temperature of the whole mass of liquor constituting a brewing, which is of very great importance, and not attainable by the old arrangements; 6th, an important saving, and perfection in the liquor—as none of it is lost, or exposed to the injurious action of the oxygen of the atmosphere, but every drop of it remains in the tun, covered by a thick stratum of carbonic acid gas, besides the cover (C), until ready for racking—when the yeast is allowed to run off, down the conduit pipe—leaving the whole of the liquor fine, sound and perfect; and finally there is also advantage in racking off the liquor from a large flat bottomed vessel, over the same operation from the several puncheons, on account of the sediment, which becomes disturbed in the latter, from the necessity of tilting the puncheons as the surface of the fluid nears the bottom, and besides all these advantages, I am enabled at a very trifling cost, to have a permanent thermometer attached, to indicate the temperature; and also to connect with the liquor, a gage tube of glass, on the outside of each tun, so as to have always indicated, precisely, the number of barrels or gallons of liquor remaining therein—with the greatest convenience and accuracy.

Having thus given a full, clear and exact description of the construction and operation of my invention, and pointed out its peculiar advantages, I proceed to state that I do not claim simply a large vessel or tun for fermenting malt liquors, as vessels of various forms and sizes have been used heretofore for other purposes—but

What I claim as my invention and desire to secure by Letters Patent, is—

The application and use of the adjustable cover (B) and the conduit pipe (C) constructed and arranged substantially as described and illustrated, in combination with the tun (A) or any other suitable vessel, substantially and for the purpose as described.

A. HAMMER.

Witnesses:
BENJ. MORRISON,
MICHAEL W. ASHE.